United States Patent
Mängel et al.

(10) Patent No.: US 10,450,449 B2
(45) Date of Patent: Oct. 22, 2019

(54) PVC-FREE SEALS FOR TWIST CROWNS

(75) Inventors: Dany Mängel, Twistringen (DE); Waldemar Eichler, Bremen (DE)

(73) Assignee: Actega DS GmbH, Bremen (DE)

(*) Notice: Subject to any disclaimer, the term of this patent is extended or adjusted under 35 U.S.C. 154(b) by 1041 days.

(21) Appl. No.: 13/511,095

(22) PCT Filed: Nov. 20, 2009

(86) PCT No.: PCT/EP2009/008274
§ 371 (c)(1),
(2), (4) Date: Oct. 17, 2012

(87) PCT Pub. No.: WO2011/060804
PCT Pub. Date: May 26, 2011

(65) Prior Publication Data
US 2013/0026127 A1    Jan. 31, 2013

(51) Int. Cl.
| | | |
|---|---|---|
| B65D 53/04 | (2006.01) | |
| C08L 23/08 | (2006.01) | |
| C08L 23/04 | (2006.01) | |
| C08L 23/06 | (2006.01) | |
| C08L 23/10 | (2006.01) | |
| B65D 41/12 | (2006.01) | |
| C08L 23/02 | (2006.01) | |
| B65D 41/17 | (2006.01) | |

(52) U.S. Cl.
CPC .......... *C08L 23/0815* (2013.01); *C08L 23/04* (2013.01); *C08L 23/06* (2013.01); *C08L 23/10* (2013.01); *B65D 41/17* (2013.01); *B65D 53/04* (2013.01); *C08L 23/02* (2013.01)

(58) Field of Classification Search
CPC .......... B65D 41/0407; B65D 41/0435; B65D 41/045; B65D 41/17; B65D 53/04; C08L 23/0815; C08L 23/04; C08L 23/06; C08L 23/10; C08L 23/02; C08L 2666/24
USPC ............................... 215/233, 327, 324, 349
See application file for complete search history.

(56) References Cited

U.S. PATENT DOCUMENTS

| | | | |
|---|---|---|---|
| 4,111,326 A * | 9/1978 | Percarpio | A61B 5/1438 215/247 |
| 4,256,234 A * | 3/1981 | Mori | B65D 53/04 215/343 |
| 5,060,818 A | 10/1991 | Doi et al. | |
| 7,134,565 B1 * | 11/2006 | Wan | B65D 41/0492 215/276 |
| 8,916,078 B2 * | 12/2014 | Poel-Asendorf | B65D 41/045 264/268 |
| 2010/0006532 A1 * | 1/2010 | Lee | B65D 53/04 215/349 |
| 2013/0026127 A1 * | 1/2013 | Mangel | C08L 23/04 215/233 |
| 2013/0206770 A1 * | 8/2013 | Poel | C08L 53/00 220/304 |
| 2014/0209611 A1 * | 7/2014 | Mangel | B65D 41/0435 220/304 |
| 2015/0028035 A1 * | 1/2015 | Mangel | B65D 41/0442 220/304 |

FOREIGN PATENT DOCUMENTS

| | | |
|---|---|---|
| EP | 0 250 057 A2 | 6/1987 |
| EP | 1 116 747 A1 | 7/2001 |
| EP | 1 816 086 A1 | 8/2007 |
| EP | 1 894 974 A1 | 3/2008 |
| EP | 2 058 379 A1 | 5/2009 |

OTHER PUBLICATIONS

International Search Report for International Application No. PCT/EP2009/008274, European Patent Office, Rijswijk, Netherlands, dated Mar. 5, 2010.

International Preliminary Report on Patentability for International Application No. PCT/EP2009/008274, European Patent Office, Rijswijk, Netherlands, dated Jun. 12, 2012.

* cited by examiner

*Primary Examiner* — J. Gregory Pickett
*Assistant Examiner* — Niki M Eloshway
(74) *Attorney, Agent, or Firm* — Sterne, Kessler, Goldstein & Fox, P.L.L.C.

(57) ABSTRACT

The invention relates to a polymer compound for a PVC-free sealing insert for twist crowns, wherein the Shore A hardness of the polymer compound is between 50 and 90 and in the compressive deformation test analogous to ASTM D395-97 Method B at 70 DEG. C. the polymer compound exhibits a compression set of 30-90%.

20 Claims, No Drawings

PVC-FREE SEALS FOR TWIST CROWNS

The invention relates to a polymer compound for the manufacture of PVC-free twist crown cap seals or liners.

Twist crown caps are advantageous compared to the conventional pry-off crown caps for the consumer because they can be opened without tools. In some countries twist crowns have emerged as the standard solution over the years in such a way that in those countries, bottled beer without twist crown caps is no longer conceivable and twist crowns represent a fundamental expectation of the customer. The simple opening of twist crown caps without the need for a tool is a major advantage of twist crowns compared to traditional crown caps.

In industry, seals for twist crown caps are produced from PVC-containing compounds. These seals are usually made of PVC in general and soft or flexible PVC in particular, because only then the strict requirements on the tightness and the opening forces are ensured. The tightness of the twist crown cap must on the one hand prevent leakage of the fill content, which is not a trivial task in particular for liquids under pressure such as beer, and on the other hand must avoid contamination of the fill content. In addition, the seal, as already mentioned, has to withstand the opening forces. So it must be ensured that the container can be opened by a rotary movement of the twist crown cork, but that it does not open on its own. As an additional requirement of the seal, it must also be ensured that the opening and closing may be repeated as often as desired without a loss of the tightness and/or the opening forces. Typically, such PVC-containing compounds are applied in form of plasticizer-containing systems which are liquid a room temperature, since all attempts to manufacture them from PVC-free materials have failed so far.

However, it is undesirable to use PVC-containing compounds in seals for container closures, neither in the form of PVC in general nor in the form of flexible PVC in particular. In the conventional incineration of household waste, halogen-containing plastics generate acidic gases whose escape into the atmosphere is harmful. In addition, even small amounts of PVC impede the mechanical recycling of plastic waste. Moreover, such PVC-based sealing elements require the use of plasticizers, which are undesirable for health reasons.

There is therefore a need for twist-crown closures, which have a polymer-based sealing insert or liner, which is not based on PVC. With all these characteristics, the seals must also comply with the above-mentioned requirements concerning the possible migration of their chemical constituents.

Thus, it is one major objective of the invention to provide a sealing insert or liner for the manufacture of twist-crown closures, which allows equipping of the container closure with a polymer-based sealing element which does not contain PVC, and which comply with legal regulations concerning the migration of packaging components.

It is still another objective of the invention to define corresponding container closures.

It has surprisingly been found that certain compounds with a suitable Shore A hardness, and preferably based on TPE, polyolefin, and white oil, generally meet these requirements.

The formulation according to the invention allows the production of seals of twist crown caps that meet the mentioned requirements in regard to the tightness and the opening force without comprising PVC-containing compounds.

To achieve the object of using a PVC-free polymer compound as a sealing liner for twist crowns, the sealing liner for twist crown caps according to the invention is provided with the features as defined in claim 1.

Furthermore, the invention comprises the use of particularly suitable polymer compounds for the production of such container closures.

In the twin-crown closures according to the invention, the sealing element is formed as a liner on the inner surface of the container closure, similarly as it is the case for the common twist crown caps.

More specifically, the invention is related to a container closure made of metal such as aluminum, for holding drinks, which have to be protected from migration of packing components according to legal regulations.

Generally, in the manufacturing method according to the invention, the container closure blank is assumed to be made of metal, preferably first pretreated on its inner side with a suitable primer. Particularly suitable for this purpose is a TPE coat, such as the primer coat developed by the company Rhenania (e.g. HLD 79), to which the most preferred compounds according to the invention adhere particularly well. Bisphenol A-free coats are preferred.

Alternatively, a suitable primer coating can be deposited by lamination, lining or possibly also by co-extrusion.

In order to ensure a tight closure of the container, the container closures according to the invention possess the above-mentioned requirements concerning their processibility on the one hand and their sealing properties on the other hand. Additionally, they meet the legal requirements concerning the migration of packaging components.

In particularly preferred embodiments of the invention, the container closure is suitable for sterilization.

In a preferred embodiment the compound comprises not more than 10%, preferably not more than 7%, more preferably not more than 4% and even more preferably not more than 1% of lubricants.

In preferred embodiments, the compound comprises between 10% to 40% thermoplastic elastomers (TPE) based on styrene-ethylene-butylene-styrene (SEBS), and more preferably the material comprises between 20% to 30% of TPE based on SEBS.

In special preferred embodiments, the compound comprises between 10% to 30% polyethylene (linear low-density polyethylene, LLDPE), preferably the material comprises between 15% to 25% LLDPE.

In other preferred embodiments, the compound comprises between 5% to 25% of polyethylene (low-density polyethylene, LDPE), more preferably the material comprises between 10% to 20% LDPE.

In further preferred embodiments, the compound comprises between 2% to 20% copolymer consisting of polypropylene (PP) and polyethylene (PE), more preferably the material comprises between 5% to 15% copolymer.

Preferably, the compound comprises between 20% to 45% medicinal white oil, and especially the material comprises between 30% to 40% medicinal white oil.

Furthermore, it is preferred that the material of the sealing insert comprises no typical plasticizers, in particular ester-based plasticizers such as phthalates.

A particularly preferred compound according to the invention comprises a thermoplastic elastomer based on SEBS, with a fixed styrene content of 31%, in the range of 24%-28%, a polyolefin, such as ADFLEX C 200 F in the range of 6%-10%, an LDPE polyethylene, such as LDPE MFI 2 in the range of 10%-14%, lubricants comprising erucic acid amide, such as Finawax E in the range of 0.4%-0.6%, pigments such as titanium dioxide in the range of 0.2%-0.4%, antioxidants, such as IRGANOX 1010 in the range of 0%-0.2%, stabilizers, such as IRGAFOS 168 in the range of 0%-0.2%, white oil in the range of 33%-37% and an LLDPE polyethylene, such as SABIC 118N in the range of 16%-20%.

An exemplary formulation comprises:
Polyolefin: 8%
LDPE polyethylene: 12%
Erucic acid amide: 0.5%
Antioxidant: 0.1%
Stabilizer: 0.1%
SEBS (fixed styrene content 31%): 26%
White oil viscosity 70: 35%
LLDPE polyethylene: 18%

According to the invention, said material has a Shore A hardness of 50 to 90, preferably a Shore A hardness of 60 to 80 and more preferably has a Shore A hardness of 65 to 75.

Optionally, pigments (preferably inorganic pigments, to virtually rule out migration) can be added to the formulations of the compounds.

It has also been shown that other additives such as waxes and silicones may be added to the polymer compounds, for example to improve processing and performance characteristics.

The construction of sealing liners from the compound according to the invention in appropriate blanks of twist crown caps is carried out in a known manner The use of said polymer material according to the invention not only allows that such produced sealing insert can be produced unproblematically and with the sealing properties as described above. Moreover, such container closures are pasteurizable, and they meet the above-mentioned European legal regulations concerning the migration of constituents of the polymer material in the drink or food stuff which are enclosed in containers sealed according to the invention.

What is claimed is:

1. A twist crown cap having a PVC free sealing liner, wherein the sealing liner comprises a polymer-based composition, comprising:
   10 to 40% thermoplastic elastomer (TPE) based on styrene-ethylene-butylene-styrene (SEBS);
   at least one polyolefin component selected from the group consisting of between 10% to 30% linear low-density polyethylene polyethylene (LLDPE), between 5% to 25% low density polyethylene (LDPE), and between 2% to 20% copolymer consisting of polypropylene (PP) and polyethylene (PE); and
   white oil in an amount of not more than 50%,
   wherein the Shore A hardness of the polymer-based composition is in the range of 50 to 90 and the polymer-based composition exhibits a compression set of 30-90% in the compressive deformation test analogous to ASTM D395-97 Method B at 70° C.;
   wherein the sealing liner is on the inner surface of a container closure; and
   wherein the sealing liner prevents leakage of fill content in the container closure.

2. The twist crown cap according to claim 1, wherein the polymer-based composition further comprises a lubricant in an amount not more than 10%.

3. The twist crown cap according to claim 2, wherein the lubricant is present at not more than 7%.

4. The twist crown cap according to claim 2, wherein the lubricant is present at not more than 4%.

5. The twist crown cap according to claim 1, wherein the TPE based on SEBS is present at 20% to 30%.

6. The twist crown cap according to claim 1, wherein the polyolefin comprises between 15% to 25% linear low-density polyethylene polyethylene (LLDPE).

7. The twist crown cap according to claim 1, wherein the polyolefin comprises between 10% to 20% low density polyethylene (LDPE).

8. The twist crown cap according to claim 1, wherein the polyolefin comprises between 5% to 15% copolymer consisting of polypropylene (PP) and polyethylene (PE).

9. The twist crown cap according to claim 1, wherein the polymer-based composition comprises at least 20% of (a) a block copolymer that is an interpolymer of ethylene and at least one $C_3$-$C_{20}$ alpha-olefin or (b) a copolymer of ethylene and one $C_3$-$C_{20}$ alpha-olefin, in either case optionally in combination with other unsaturated monomers.

10. The twist crown cap according to claim 9, wherein the block copolymer has a density of 0.85 to 01.1 g/cm³, a melt flow index (MFI) of 0.01 g/10 min to 1000 g/10 min at 190° C., and a gravimetric load of 5 kg.

11. The twist crown cap according to claim 10, wherein the block copolymer has a melt flow index (MFI) of 1 g/10 min to 100 g/10 min at 190° C.

12. The twist crown cap according to claim 1, wherein the polymer-based composition comprises between 20% to 45% medicinal white oil.

13. The twist crown cap according to claim 12, wherein the polymer-based composition comprises between 30% to 40% medicinal white oil.

14. The twist crown cap according to claim 1, wherein the polymer-based composition further comprises an additive selected from the group consisting of waxes, silicones, and combinations thereof.

15. The twist crown cap according to claim 1, wherein the polymer-based composition has a Shore A hardness of 60 to 80.

16. The twist crown cap according to claim 15, wherein the polymer-based composition has a Shore A hardness of 65 to 75.

17. The twist crown cap according to claim 1, wherein the polymer-based composition comprises between 30% to 40% medicinal white oil.

18. The twist crown cap according to claim 1, wherein the polymer-based composition comprises between 20% to 30% TPE based on SEBS, between 15% to 25% LLDPE, and between 30% to 40% medicinal white oil.

19. The twist crown cap according to claim 1, wherein the polymer-based composition comprises between 20% to 30% TPE based on SEBS, between 10% to 20% LDPE, and between 30% to 40% medicinal white oil.

20. The twist crown cap according to claim 1, wherein the polymer-based composition comprises between 20% to 30% TPE based on SEBS, between 5% to 15% copolymer consisting of PP and PE, and between 30% to 40% medicinal white oil.

* * * * *